(12) United States Patent
York

(10) Patent No.: US 6,745,291 B1
(45) Date of Patent: Jun. 1, 2004

(54) HIGH SPEED LRU LINE REPLACEMENT SYSTEM FOR CACHE MEMORIES

(75) Inventor: Kenneth Lindsay York, Huntingdon Valley, PA (US)

(73) Assignee: Unisys Corporation, Blue Bell, PA (US)

( * ) Notice: Subject to any disclaimer, the term of this patent is extended or adjusted under 35 U.S.C. 154(b) by 448 days.

(21) Appl. No.: 09/634,014

(22) Filed: Aug. 8, 2000

(51) Int. Cl.$^7$ ................................ G06F 12/00
(52) U.S. Cl. .................. 711/128; 711/133; 711/134; 711/144; 711/159; 711/160
(58) Field of Search ................. 711/128, 159, 711/160, 133, 134, 144

(56) References Cited

U.S. PATENT DOCUMENTS

| | | | |
|---|---|---|---|
| 4,463,424 A | * 7/1984 | Mattson et al. | 711/136 |
| 6,230,219 B1 | * 5/2001 | Fields et al. | 710/22 |
| 6,240,489 B1 | * 5/2001 | Durham et al. | 711/136 |
| 6,393,525 B1 | * 5/2002 | Wilkerson et al. | 711/136 |
| 6,434,671 B2 | * 8/2002 | Chung | 711/129 |

\* cited by examiner

*Primary Examiner*—Donald Sparks
*Assistant Examiner*—Ngoc Dinh
(74) *Attorney, Agent, or Firm*—Nathan Cass; Mark T. Starr; John B. Sowell

(57) ABSTRACT

An N-way set associative data cache system comprises a cache controller adapted to receive a request for data and instructions. The cache controller includes a cache buffer register for storing the requests for a line of information in the form of a page tag address and line address. The line address is stored in the buffer register as a pointer into a directory associated with each of the N-ways for determining where the line being accessed resides. If the page tag address matches one of the page entry addresses in one of the directories, there is a hit, but if not, the line of data must be fetched by a cache fill request. The line of data is retrieved from an L2 cache or main memory and written into the line of one of the ways at the line address being accessed. A novel LRU ordering tree or look-up table is provided for determining concurrently the one line in the number of N-lines in the cache to be replaced with the new line of data in the event of a miss.

9 Claims, 7 Drawing Sheets

| NO. "N" OF LRU ITEMS | FACTORIAL "N" COMBINATIONS | ADDRESS LOCATIONS REQUIRED | LRU MEM. WIDTH IN BITS | ACTUAL NUMBER OF MODE IN TREE REQ'D (1) | THEORETICAL NO OF MODE (2) |
|---|---|---|---|---|---|
| 2 | 2 | 4 | 2 | $2^2$ | $2^2$ |
| 3 | 6 | 18 | 5 | $2^5$ | $2^8$ |
| 4 | 24 | 96 | 7 | $2^7$ | $2^{10}$ |
| 6 | 720 | 4320 | 13 | $2^{13}$ | $2^{21}$ |
| 8 | 40320 | 322560 | 19 | $2^{19}$ | $2^{27}$ |
| 10 | 3.63 MIL | 36.3 MIL | 26 | $2^{26}$ | $2^{44}$ |

*Figure 8*

HIGH SPEED LRU LINE REPLACEMENT SYSTEM FOR CACHE MEMORIES

BACKGROUND OF THE INVENTION

1. Field of the Invention

The present invention relates to high speed computers (CPU) of the type having cache memories and cache controllers for speeding up access to data and instructions stored in memories. More particularly, the present invention relates to a novel expanded cache memory and a memory table for identifying the least recently used (LRU) line of data in a cache memory for replacement when a miss occurs.

2. Description of the Prior Art

Cache memories are well known and have been employed by IBM in some of their Series 360 line of computers since the 1960's as well as by Intel in their 486 microprocessor chips and Pentium chips.

Intel chips have employed two levels of cache memories. The L1 cache level memory is made on the same chip as the CPU and access to data and instructions has been substantially increased. Now that the Level 2 cache memories have been placed between the CPU and the main memories even greater access speeds have been achieved. The trend is to larger and faster microprocessor chips; thus, the trend extends to larger cache memories to accommodate the even larger RAM memories that accompany these chips. As technology keeps advancing, the trend has been to increase the sizes and speed of cache memories and to expand their application. There are many practical trade-offs in cache memory design, but as the speed of computers keeps increasing, there is intense pressure to increase cache memory sizes to improve the effective hit rate of data capture which in effect, decreases the average access time to date. However, because a cache memory is smaller than the actual memory being referenced, and very high speed cache designs are typically set associative, there is a significant tradeoff in design involving the sizes and number of sets in the set associative memory. It is possible to reach a point in a set associative cache design where the increased number of sets used in the cache memory can slow the access time regardless of the size of the cache memory. An example of a two-way set associative data cache as employed in Pentium microprocessors will illustrate the point. The data cache comprises two ways or banks of cache memory wherein each has 128 lines of 32 bytes of data each. When a miss occurs in the cache memory, a whole new line of data must be obtained from the L2 cache or from main memory and written over the least recently used (LRU) line in one of the two ways. The logic employed assumes that seldom if ever will the program being run call for use of the same line number from three different pages of the two million pages of data in memory. However, this is not always the case and each time that the same three lines are needed there are only two available and only two can possibly reside in a two-way cache. If the same third line is not in cache memory, the cache controller must issue a line fill request and fetch the missing line then write the line into the way whose line was least recently used. Thus, it is possible to throw out one line that will be needed in the short term because the two-way set associative data cache only permits two lines with the same line number even though the pages from which they came are numbered in the millions of pages.

Accordingly, it would be ideal to provide an "N " way set associative data cache memory that eliminates the problems of two-way set associative data cache memories without introducing delays and other penalties that would slow access time or increase the cost of the cache memory substantially which would be a consequence of the "N" way associativity.

SUMMARY OF THE INVENTION

It is a principal object of the present invention to provide an N-way set associative data cache memory.

It is a principal object of the present invention to provide a high speed LRU look-up table for producing the least recently used line in a set associative data cache memory.

It is another principal object of the present invention to provide a modification to widely used data cache memories that permits expansion of the main memory as well as the data cache memory without incurring access time penalties.

According to these and other objects of the present invention there is provided an N-way set associative data cache memory with N-tag directories and N-ways or banks each having M-lines that may be accessed by a line address and confirmed by a directory tag address to determine a hit or miss in the cache memory. In the event of a miss, there is provided a novel look-up table that produces the least recently used line in one of the N-ways concurrent in time with the operation of fetching of a new line of data from an L2 cache or a main memory.

DESCRIPTION OF THE DRAWINGS

FIG. 8 is a table showing the number of memory address slots and bits required to implement an LRU look-up table in memory.

DETAILED DESCRIPTION OF THE PREFERRED EMBODIMENTS

Figure 1:
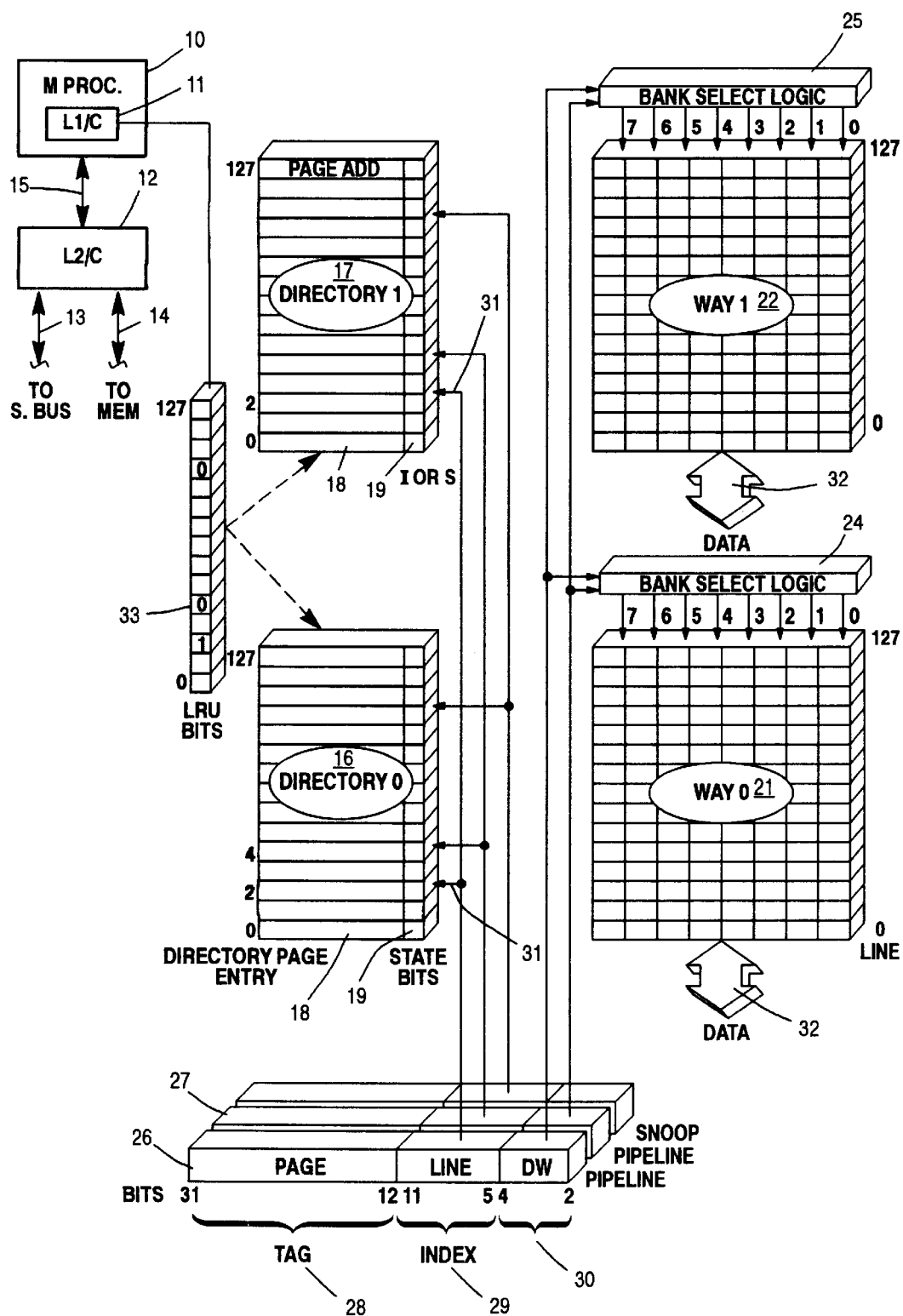
FIG. 1 is a schematic block diagram of a prior art code or instruction cache which is organized in a two-way set associative configuration.

Refer now to FIG. 1 showing a block diagram of a prior art instruction cache organized in a two-way set associative configuration. The microprocessor 10 is shown having an on board Level 1 (L1) cache and controller 11 which is shown connected to an external or either on board Level 2 (L2) cache and controller via a line 15 which may be internal or external. The L2 cache controller 12 is shown having a connection to the outside systems bus 13 and to the memory bus 14.

The two directories zero and one shown as 16 and 17 are provided with a directory page entry portion 18 and a status bit portion 19 for each of the 128 entries that are stored therein.

Way zero and way one are numbered 21 and 22 and each comprises 128 lines of data or instructions. Each of the 128 lines are numbered sequentially for access purposes and divided into eight double words of four bytes each as will be explained in detail hereinafter. Each way 21 and 22 is provided with a bank select logic block 24 and 25 which are used to select one of the double words from one of the 128 lines from one of the ways when an access to cache memory is attempted. Access is obtained by the controller 11 which generates an access address shown as addresses 26 and 27 comprising thirty-one bits which define a page tag portion and a line index portion and a double word designation portion numbered 28 through 30.

To avoid cycling and repetitive searching, the line index 29 has pointers which point to the ways as well as the directories 16 and 17. For example, if the address 26 is attempting to access line two in one of the ways 21 and 22 it will generate a pointer 31 to the directories 16 and 17 at line two. To speed up performance of access of the information desired, there is provided a state bit at columns 19 in the directories 16 and 17. If the state bit is invalid (I), then access to the information in way 21 or 22 cannot be made and must be replaced by fetching valid information from cache L2 or the main memory (not shown). However, if the state bit 19 is shared or valid, then the tag or page information in the directory portion 18 is compared with the tag portion 28. If a comparison occurs at directory 16 or 17, then the data in way 21 or 22 at the valid page comparison entry contains the data being sought. By associating the pages in memory with the lines in the ways, access to the cache memory may be performed in a minimum number of clock cycles. However, if there is a miss resulting from an invalid entry in the directories or the page at the line number is the wrong page, then the controller 11 must fetch the proper information from the main memory or the L2 cache and subsequently write it over the data in a line in a way 21 or 22 and place the proper page number at the same line in the directory zero or one, as the case may be.

Assume that the hit occurred in the cache memory of way zero, then the bank select logic 24 will read the double word entry 30 and select one of the eight double words for a readout onto the data bus 32.

There is shown an LRU register 33 which contains 128 bits which correspond to the 128 lines in the ways 21, 22 and the 128 pages in the directories 16 and 17. Since there are only two directories, if there is a miss or the state bit 19 is invalid, a line of data must be replaced in one of the ways. If invalid, it must be replaced and the LRU bit is valid for the other directory. However, if there is a miss in one of the directories the controller must determine which of the two directories contains the LRU bit and replace that line of data and that page address corresponding to the LRU bit in register 33.

Figure 2:
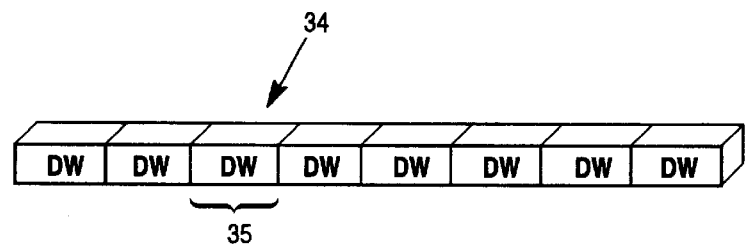
FIG. 2 is a schematic drawing of the prior art data cache line in the memory of FIG. 2 which comprises eight double words of four bytes each.

Refer now to FIG. 2 showing one of the 128 lines of data or instructions that are stored in the banks or ways 21 and 22. Line 34 is shown comprising eight double words of the type that is accessed by the addresses 26 and 27 each of which has a double word component 30.

Figure 3:
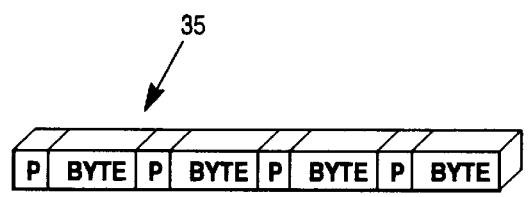
FIG. 3 is a schematic drawing of a prior art double word that comprises four parody bits and four bytes.

Refer now to FIG. 3 showing a drawing of a double word 35 comprising four bytes of eight bits each and a ninth parity bit associated with each of the four bytes. When a hit occurs in cache, a double word 35 will be read out onto the data bus 32 from one of the ways 21 or 22.

Figure 4:
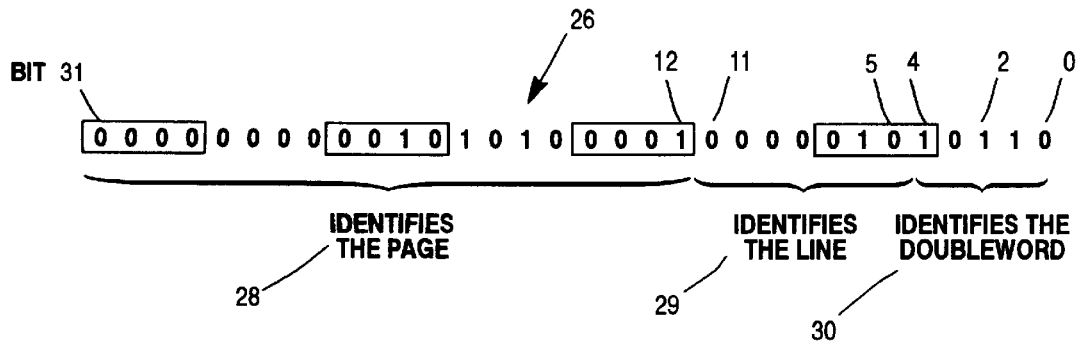
FIG. 4 is a schematic drawing of a thirty-two bit address generated by the data cache controller to access the data cache memory banks.

Refer now to FIG. 4 showing a schematic drawing of a 32 bit address generated by the data cache controller 11 in order to access one double word from way 21 or way 22. As explained hereinbefore, the information in bits 5 to 11 merely identifies the line in the way 21 or 22 but does not identify the way itself. After determining that the information in the way is valid and can be accessed, it is then necessary to determine that the bits 12 to 31 properly identify the page at that particular line before a hit occurs in the set associative memory. In the event that a hit does not occur, it is necessary to check the page tag 28 with the information in the other directories 16 or 17 to determine if the hit occurs in the other way 21 or 22. If no hit occurs in either way or the information is invalid and cannot be used, the data in the way 21 or 22 must be replaced and the line in the way with the least recently used bit in register 33 is the way that will be used to write over the line of information. If the information desired is not in the L2 cache, then it must be fetched from the main memory using one or two of the buses connected to the L2 cache and to the main memory (not shown).

Figure 5:
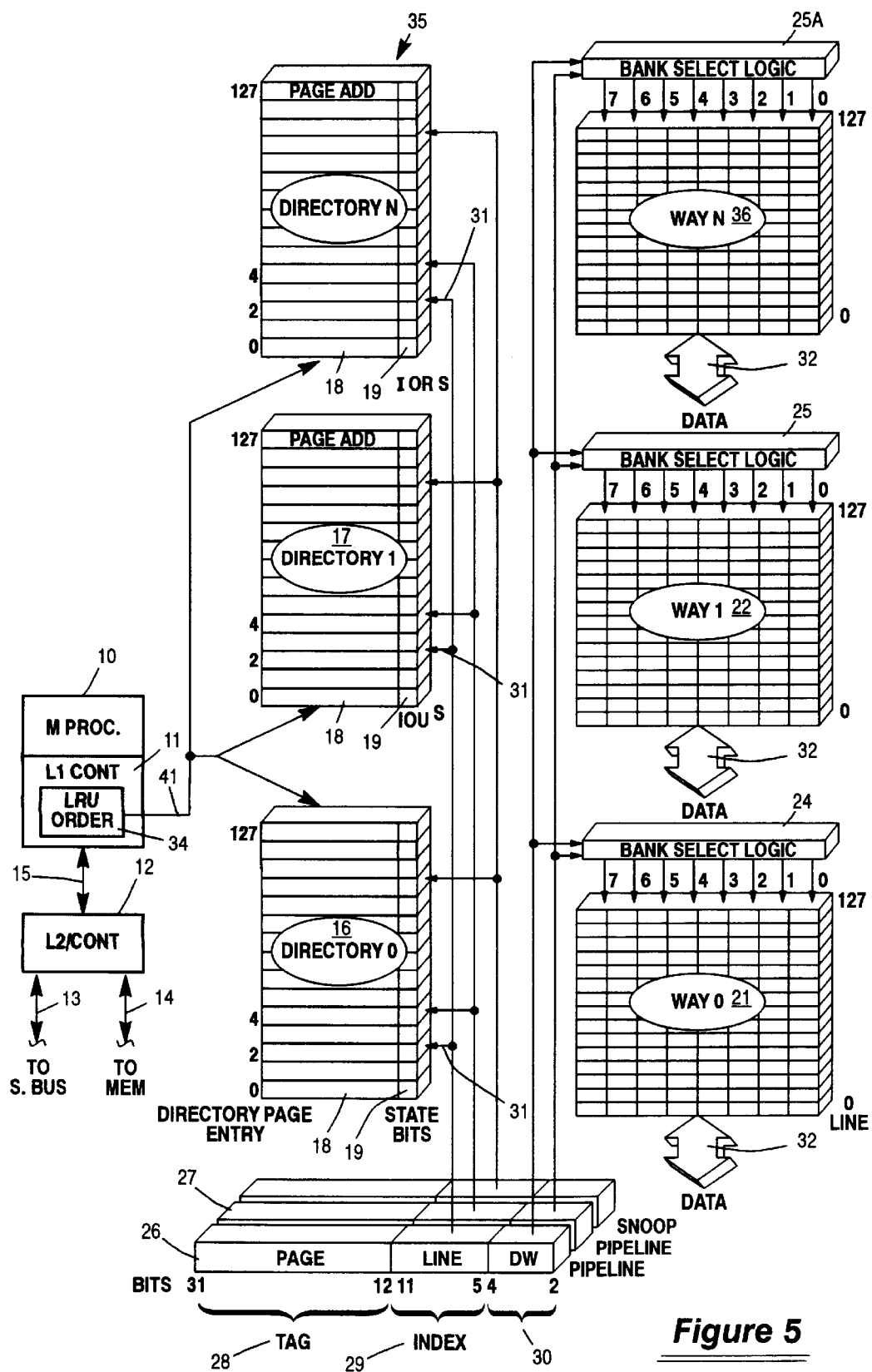
FIG. 5 is a schematic or block diagram drawing of the present invention code or instruction cache organized in an N-way set associative configuration.

Refer now to FIG. 5 showing a schematic block diagram of a preferred embodiment code or instruction cache organized in an N-way associative configuration. The numerals used in FIG. 1 through FIG. 4 which are the same as those used in FIG. 5 represent the same elements and/or functions and do not require additional detailed explanation. In the present invention, the microprocessor 10 is shown having an onboard L1 cache and controller 11 which is shown having an LRU selector 34 which connects as a pointer to directory 35 as well as the directories 16 and 17. As explained hereinbefore, when a hit occurs data from a double word is provided on data bus 32 from one of the N-directories. However, when a miss occurs it is necessary to write over one of the lines in one of the N-ways. In order to determine the least recently used line in one of the N-ways, it is necessary to remember the least recently used line for each of the 128 lines in the N-number of ways. This determination can cause considerable delays in writing over one of the lines unless the least recently used (LRU) line in the three ways is known at the time the new line of information is fetched from the L2 cache 12 or the main memory associated with bus 14. In the invention to be explained hereinafter, the LRU block 34 makes this determination concurrent with the fetching of information from the remote source.

Figure 6:
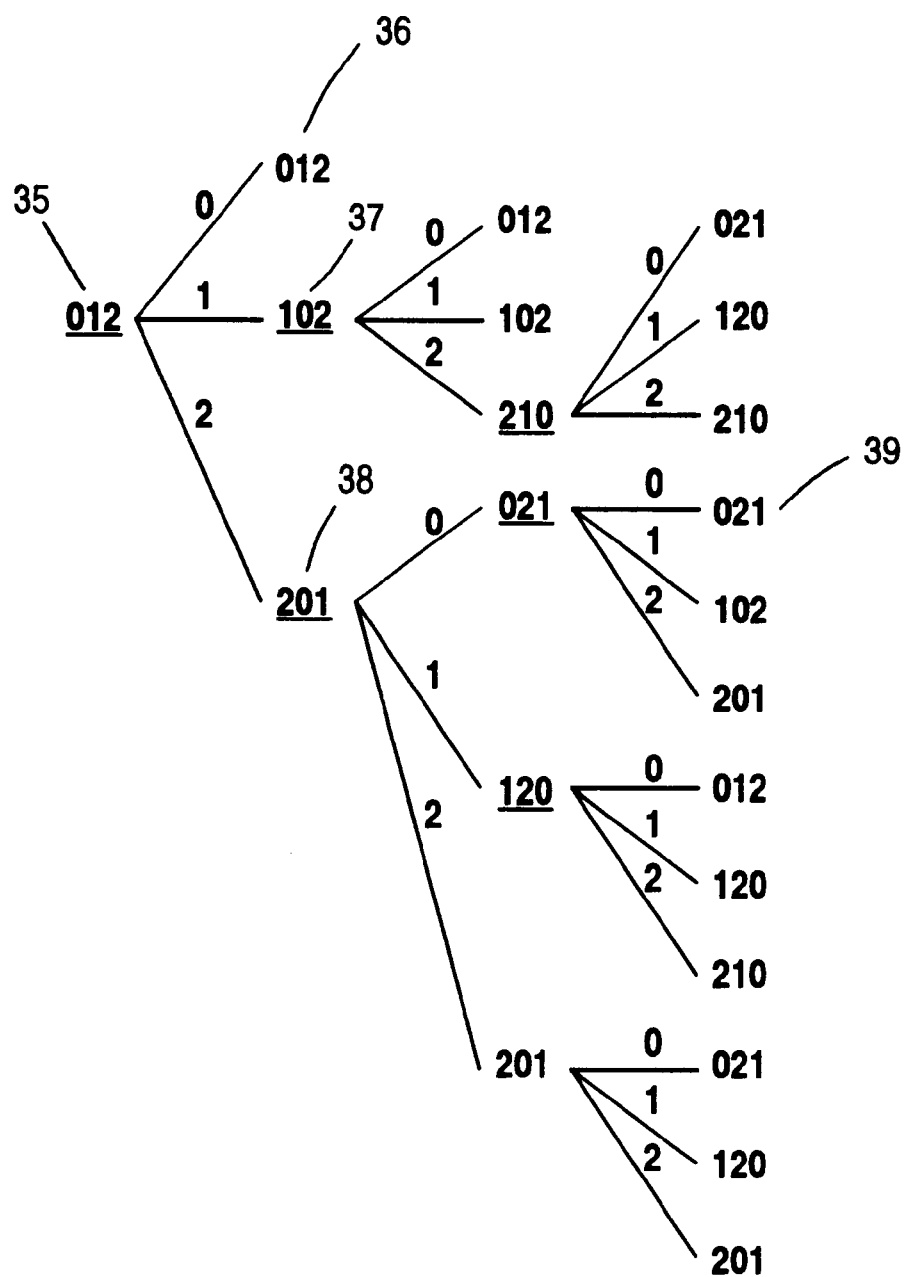
FIG. 6 is a schematic drawing of a tree structure for illustrating the determination of the LRU line in a three-way code cache.

Refer now to FIG. 6 showing a schematic drawing of a tree structure used to illustrate the determination of the LRU line in a three-way code cache. In FIG. 6, there are shown or represented three ways by the numerals 0, 1 and 2. When there are only three ways, there are only six possible combinations of 0, 1 and 2 as shown by the numerals in FIG. 6. Assume that the numerals 0, 1, and 2 shown at 35 represents the order zero as the most recently used way and the numeral 2 represents the least recently used way. This is an ordered set and there are only six possible combinations. If a line is written over in way zero, then the ordering of the ways remains the same as shown at numeral 36. Similarly, if the line in question is replaced at way one, then the ordering becomes 1, 0, 2 shown at numeral 37. Similarly, if the line being replaced is in way two, which in this case is way N, then the ordering becomes 2, 0, 1 as shown at the numeral 38. Each line in each way must remember its last order and change its ordering as the lines are replaced in the other ways. The tree in FIG. 6 shows all of the possible changes and reorders for all of the lines in all of the ways 21, 22 and 36. The tree structure of FIG. 6 clearly illustrates that each of the 128 lines in each of the three ways can be represented as having a node or point on the tree shown. When a new line is written over in one of the ways, then that node at that line of a particular way changes by the numerals shown on the branch. For example, if the line in question had the ordering 021 and its line was written over as represented by zero on the branch, then the ordering or LRU for that particular line remains the same as shown at the numeral 39. Further, any line with the same ordering which is reordered moves to the new order as shown by the movement to the right through one of the branches. Since there are only six unique ordered sets they may be viewed as nodes in the tree structure. Moving through the branches using the most recently used line in one of the ways produces a new ordering or node for each of the lines in question. This tree structure may be reduced to a look-up table format as will now be explained.

Figure 7:
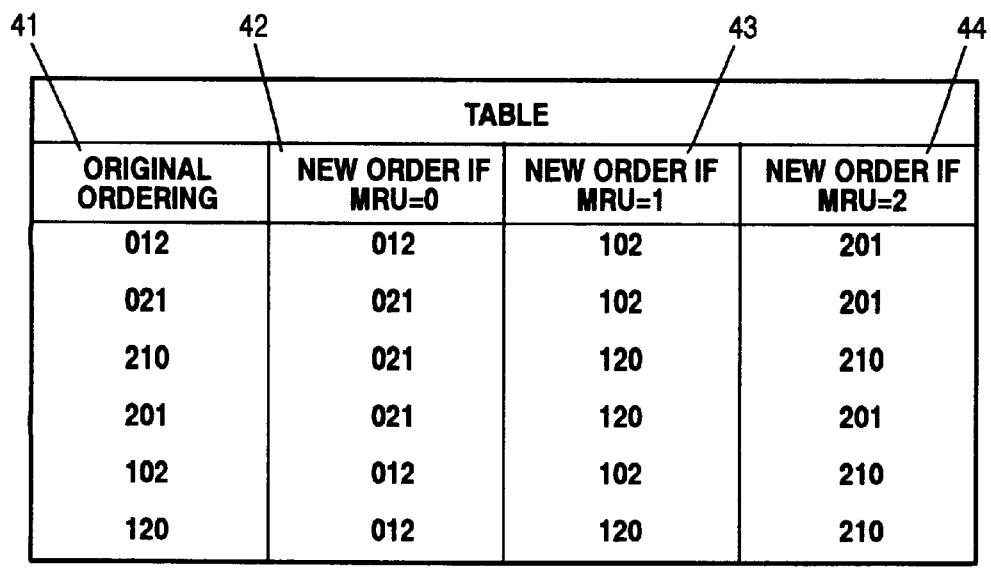
FIG. 7 is a look-up table in memory for determining the LRU for each line in each way or bank and implements the tree logic shown in FIG. 6.

Refer now to FIG. 7 showing a look-up table in memory for determining the LRU for each of the lines and each of the N-ways and which implements the tree logic structure shown in FIG. 6. The vertical column 41 shows the six possible combinations and ordering for three ways, zero, one and two. If the line and way in question is way zero, then the new ordering for column 41 is shown at column 42. Similarly, if the most recently used (MRU) line for way one and way two occur, then the original ordering in column 41 is shown in columns 43 and 44, respectively. The table in FIG. 7 illustrates how it is possible to remember the original ordering at each of the lines and produce a new ordering knowing the most recently used way or MRU following the original ordering, thus producing a new order of the type shown at columns 42, 43 and 44. This table produces all of the possible changes of orders and also shows at the last number in the order the least recently used way. For example, if the ordering was 012 and the MRU was two, then the new ordering is 201. Even though the ordering changes for each of the lines at the time a line is written over in one of the ways, the table always provides the least recently used line of the three ways to be written over at the time new information is fetched from the L2 cache or main memory. In the preferred embodiment block diagram of FIG. 5, the LRU order is available on line 41 to each of the directories and to each of the ways so that it is possible to enable the correct line of 128 lines in the directories and the ways for writing into the cache memory data into the ways and pages in memory into the directories.

Refer now to FIG. 8 showing a table of the number of memory slots or addresses and the bits required in each of the slots or addresses to implement the LRU ordering table 34. The first column in FIG. 8 represents the number of ways or LRU items to be used to expand the cache memory. The number of possible combinations or sets of orders is shown in column two and is merely a calculation of the factorial numeral in the first column. Thus, factorial three equals six and factorial four equals twenty-four, etc. The number of address locations required to implement an ordering table 34 is shown in the third column and represents a multiplication or product of the numbers in the first two columns. Thus, the numeral 96 is a result of multiplying four times twenty-four, etc. The number of bits required to create the number of addresses shown in the third column is shown in the fourth column. Thus, if you desire to address four locations you can do this with two bits for an address location two bits wide. The last column in FIG. 8 represents the theoretical number of nodes that would be required in a tree structure. However, the next to last column represents the actual number of nodes that can be used to implement the tree structure, and the next to last column is merely a representation of two raised to the power of the width number of bits shown in column four.

Having explained a tree structure in FIG. 7 and a table structure in FIG. 8, it is possible to generate a single address for each of the lines of each of the N-ways and read the resulting ordering as a read out number to be remembered for the next access to the novel cache memory shown in FIG. 5.

Figure 9:
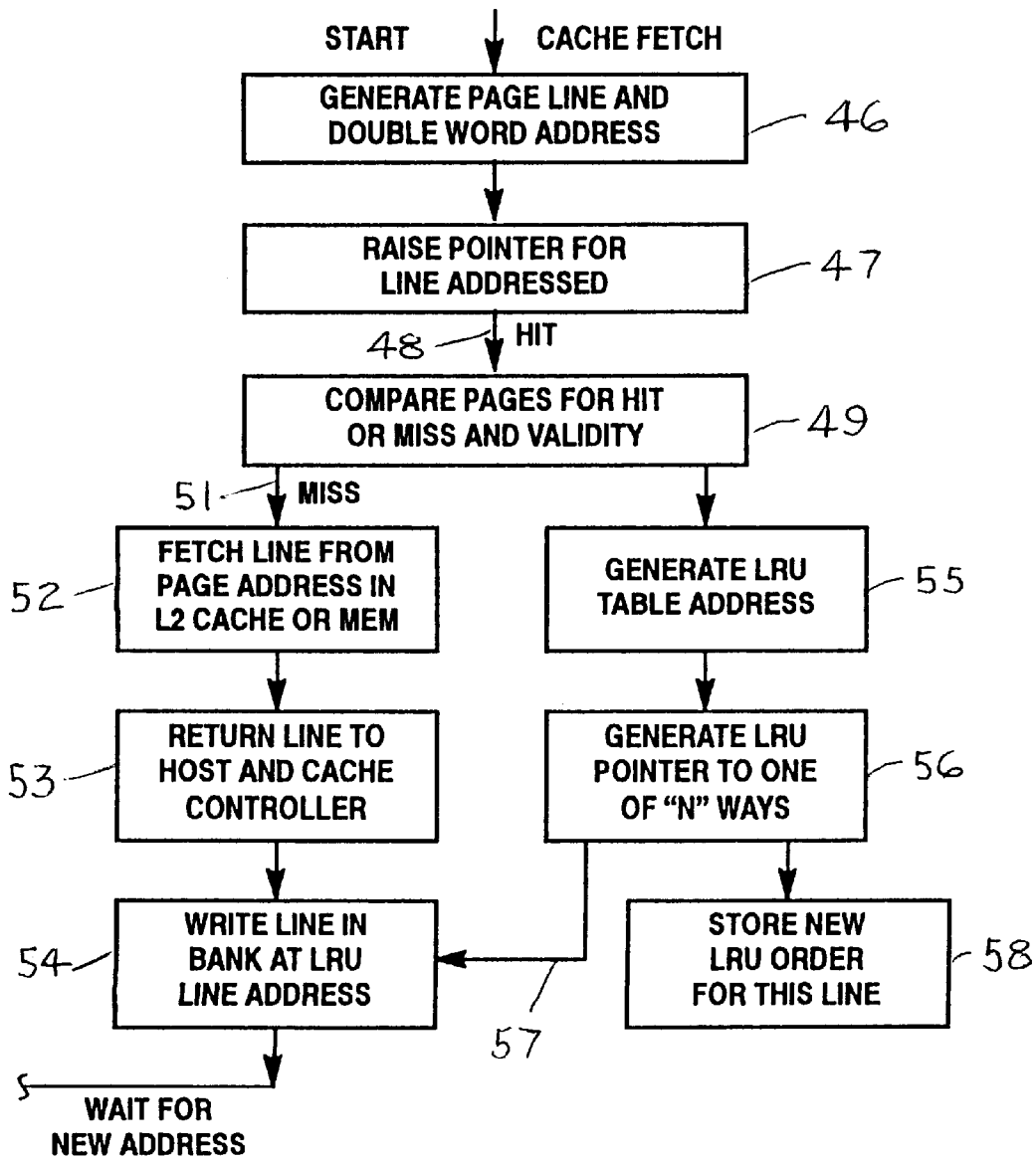
FIG. 9 is a block flow diagram of the steps employed by the cache controller when a miss occurs in the cache memory.

Refer now to FIG. 9 showing a block flow diagram of the steps employed when a miss occurs and a new line of data is fetched to be written into one of the cache ways. The cache controller starts with a cache fetch operation and as shown at block 46 generates a page, line and double word address which is deposited in the buffer registers shown in FIG. 5 as access registers 26 and 27. The information in registers 26, 27 is used to raise pointers for the line address as shown at block 47. Assuming that there is no invalid state bit in portion 19 and that the page or tag 28 compares with the page in the directory at the line being addressed, there is a hit as shown at line 48 and the comparison for the page at the line address is made at block 49. Assume now that there is a miss as shown at line 51 which results in the controller 11 raising a line fill address and the fetching of a line from a page in the tag and page address from the L2 cache memory as shown at block 52. The line of information being fetched is returned directly to the host CPU as well as the cache controller as shown at block 53. The controller writes the line of information in one of the ways or banks at the LRU line address as shown at block 54 and exits waiting a new address or action. Concurrent with the miss operation on line 51, the controller automatically generates the least recently used line at one of the N-ways 21, 22 or 36 by accessing the table or tables shown in FIG. 7. The LRU generated in block 55 automatically selects the least recently used line from the cache memory and enables that line in the directories and in the way which is least recently used. While the line is being returned to the cache controller, the block 56 generates the LRU pointer to one of the N-ways as shown at block 56 which raises an enable signal on line 57 so that the line is written in the proper bank at the proper line indicated by the LRU at block 56. While the LRU pointer is being raised, a new ordering sequence is generated at block 58 for the same line in the N-ways. It is only necessary to reorder the sequence for one line at all of the ways and does not require reordering for the other 127 lines in one way and the 128 lines in the other ways.

Having explained a modification of an existing two-way set associative cache memory to provide an N-way set associative cache memory, it will be understood that adding only one way or at most two ways to the two-way set associative configuration, the hit rate in the banks or ways is greatly increased and the odds of cycling and writing over one of two lines when three of the same numbered lines are being used within a short period of time has been completely eliminated or substantially reduced. The advantage to the present system does not require a major modification of the existing L1 cache controller. It is only necessary to add a software implementation of an LRU ordering table 34 and accompanying software to implement its use without changing the existing mode of operation. The slight increase in cost for adding each directory and its associated way and an LRU table in memory will pay for itself many times over by achieving a small increase in the hit rate. Depending on the application being run, the novel system can achieve hit rates as high as ninety-five percent.

What is claimed is:

1. An N-way set associative data cache system where N is greater than two and wherein data and instructions are arranged in pages in said system, said data cache system comprising:

a cache controller for receiving requests for accessing data and instructions from a processing unit, a cache buffer register for storing access requests in the form of a page tag address and a line address to be accessed, a plurality of N-ways each having storage capacity for a plurality of lines of data and the same numbered lines in said N-ways being addressable simultaneously by a line address from said cache buffer register, associative directories, one for each of said N-ways, each having storage capacity of the page address entry associated with each of said lines of data in each of said associated ways, programs means in said cache controller for seeking the data or instructions stored in the cache ways, said programs means comprising means for comparing the page tag address at the line address to be accessed with each of said page address entries in order to determine if the requested line of data is stored in said cache system, and LRU ordering means which connects as a pointer to said directories for determining the one line in the number of N-lines in said N-ways to be replaced with a new line of data in the event of a miss, said LRU ordering means also providing a logic-tree based look-up table which indicates how each possible LRU ordering of a line is to be changed in the event of a hit on that line, said LRU ordering means using said table to change the LRU ordering of a line following a hit thereon.

2. An N-way cache system as set forth in claim 1 wherein said LRU ordering means determines the change to be made to the LRU ordering of a line in the event of a hit concurrently with said program means determining of the requested line of data is stored in said cache system.

3. An N-way cache system as set forth in claim 1 wherein said directories provide a status bit for each line and wherein said program means includes means for determining the state of data in said N-ways at a predetermined line and for writing over a line in any way whose status bit indicates an invalid line of data.

4. An N-way cache system as set forth in claim 1 wherein said LRU ordering of said N-ways is changed after every hit or miss in said cache memory.

5. An N-way cache system as set forth in claim 1 wherein said LRU ordering of a predetermined line is available for a read out during sequential attempted access to each of said lines by comparison of page entry addresses with page tag addresses.

6. An N-way cache system as set forth in claim 1 wherein the number of N-ways comprises three to six.

7. The method of replacing lines of data in an N-way set associative cache system, comprising the steps of:

receiving a page and line fetch address from a cache controller for data or instructions located in said N-way cache system or a main memory, determining by sequential or parallel comparison of a page tag address with N-page directory entries that the data at the fetch address is not in the N-way cache system, issuing a cache line fill request to obtain the desired line of data from a main memory, fetching the desired line of data at a predetermined page and line address in said main memory, returning said line of data to said cache controller, determining which of said numbered N-lines in said N-way is the least recently used (LRU) line in said N-way cache system in the event of a miss using an ordered set of LRU way numbers derived from a logic-based look-up table which indicates how each possible LRU ordering of a line is to be changed in response to a hit on that line, and writing the returned line of data into said LRU line in one of said N-ways.

8. The method as set forth in claim 7 wherein the step of determining the least recently used line is performed concurrently with making said sequential comparisons.

9. The method as set forth in claim 7 wherein said step of determining said LRU line further comprises reading the LRU line from an ordered set of LRU ways.

\* \* \* \* \*